United States Patent Office 3,051,257
Patented Aug. 28, 1962

3,051,257
VEHICULAR STEERING SYSTEM
Heinz Selle, Nordhausen, Harz, Germany, assignor to VEB Schlepperwerk Nordhausen, Nordhausen, Harz, Germany, a corporation of Germany
Filed Dec. 7, 1959, Ser. No. 857,733
Claims priority, application Germany Jan. 9, 1959
7 Claims. (Cl. 180—79.2)

My present invention relates to a steering system for automotive vehicles.

Agricultural tractors and other types of land-working machinery are representative of vehicles having several pairs of orientable front wheels and/or an adjustable wheelbase enabling the front or steering axle to be displaced relatively to the rear axle in order to alter the weight distribution on the wheels, this being often desirable upon shifting from two-wheel drive to four-wheel drive or vice versa. Conventional mechanical or hydraulic steering systems require extensive adjustment upon such front-axle displacement, if indeed they allow for any displacement at all, or are of complex construction if designed to serve more than one pair of front wheels.

The general object of the present invention is, therefore, the provision of a simplified steering system for tractors and the like having one or more steering axles or a single rearwardly displaceable front axle for varying the spacing between the front and rear wheels of the vehicle.

According to a feature of my invention I provide a steering system for automotive vehicles which may be actuated from a manually operable actuating device (such as a steering wheel) either by direct mechanical coupling to or through the intermediary of a source of power (e.g. hydraulic cylinder, electric motor or solenoid) controlled thereby. The steering system advantageously comprises a substantially parallelogrammatic linkage connecting a first steering post with one or more additional steering posts. Each additional steering post may be fixedly associated with a respective front axle (in a multi-front-axle system) or may simply be a stud shaft to which the wheel-controlling linkage of a sole front-wheel assembly may be transferred (in an adjustable-wheelbase arrangement). The linkage includes a primary operating lever rigidly connected with a generally vertical pivot shaft serving as a fulcrum therefor and constituting the aforesaid first steering post. From an intermediate member on this shaft extending generally longitudinally of the vehicle, e.g. a pair of arms including an acute angle, the steering knuckles of a pair of front wheels are controlled via respective tie rods. The primary lever is articulated to an intermediate link which is in turn articulated to a secondary operating lever, the latter being rigidly secured to another generally vertical pivot shaft journaled in the chassis of the vehicle at a point rearwardly spaced from the previously mentioned pivot shaft. The two levers advantageously extend transversely to the vehicle axis and parallel to each other. If two pairs of front wheels are provided, the second, rearwardly positioned shaft controls the second wheel pair via a duplicate assembly of intermediate members and tie rods similar to the one referred to above. With a shiftable single front axle, on the other hand, its steering assembly is demountable from the first shaft and securable to the second shaft upon displacement of this axle with its associated front wheels from its forward to its alternative rear position.

In accordance with a more specific feature of the invention, the actuating mechanism for the steering system rotates the two pivot shafts in unison by being connected to one of the operating levers, preferably the primary lever or an extension thereof, at a point remote from its fulcrum. Advantageously, this lever is of the double-armed or first kind, with one of its arms connected directly to the actuating mechanism whereas its other arm is driven in the same sense from this mechanism over a suitable servo-motor of, for example, the hydraulic type.

The above and other objects, features and advantages of the present invention will become more readily apparent from the following description, reference being made to the accompanying drawing in which.

Figure 1:
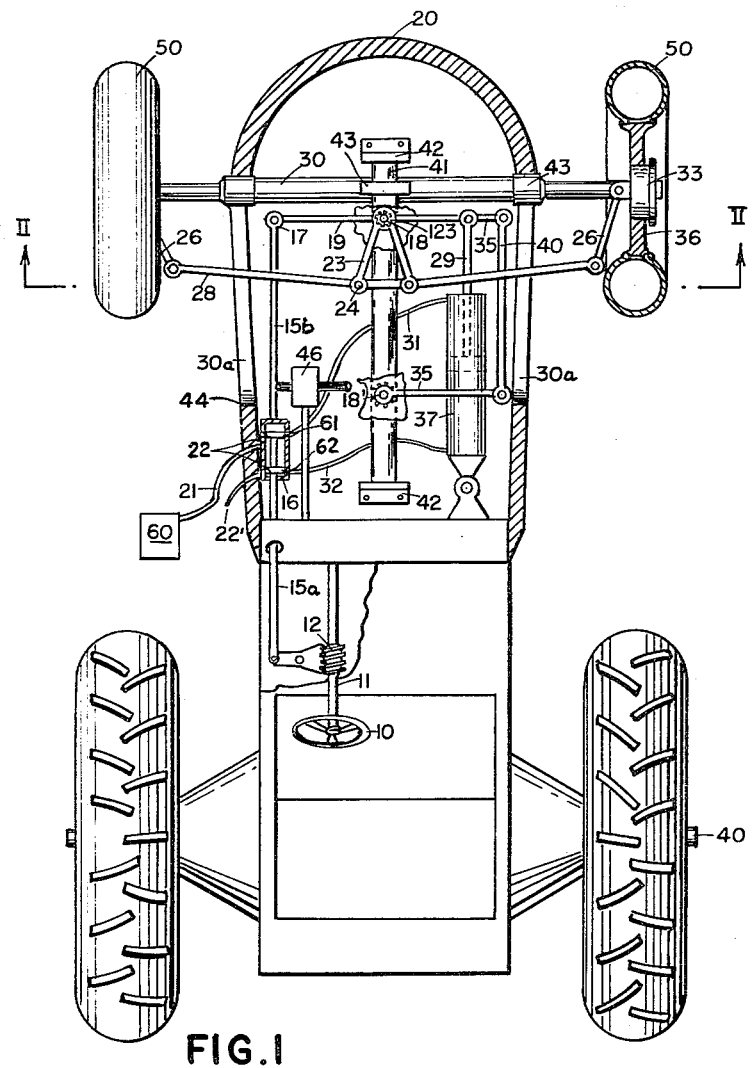
FIG. 1 is a top-plan view, partly in section, of an adjustable-wheelbase tractor embodying the invention.
Figure 2:
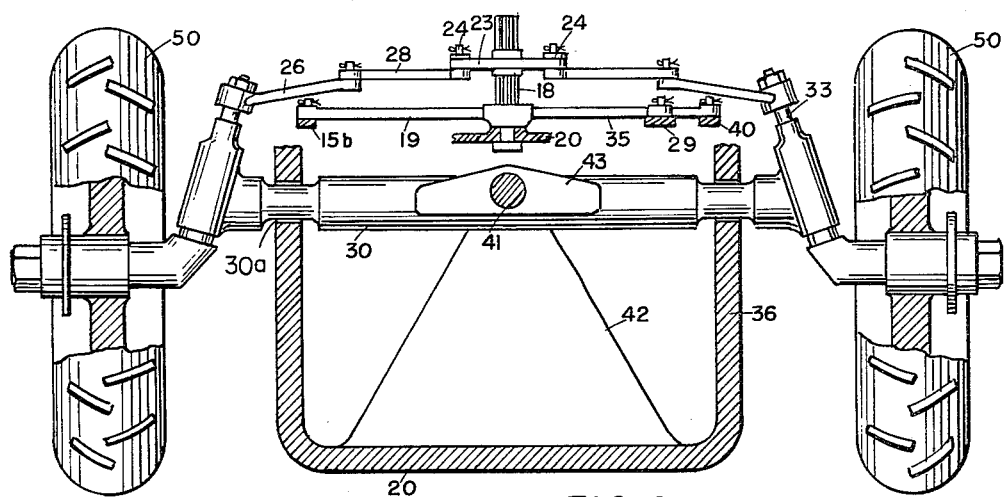
FIG. 2 is a cross-sectional view taken along line II—II of FIG. 1.
Figure 3:
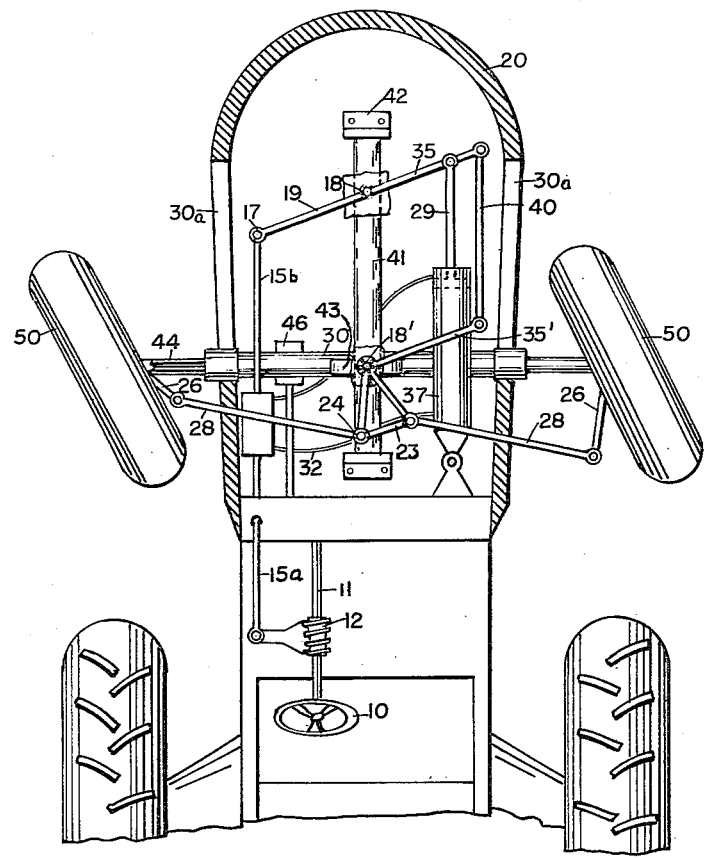
FIG. 3 is a view similar to FIG. 1, showing the tractor thereof with its front wheels rearwardly displaced from their original position.

In FIGS. 1, 2 and 3 I show an adjustable-wheelbase tractor, comprising a chassis 20 having a rear driving axle 40 fixedly projecting therefrom. The chassis is formed on opposite sides with two horizontal slots 30a accommodating a steering axle 30 for displacement relative to the driving axle 40 between a forward position (shown in FIG. 1) and a rearward position (shown in FIG. 3) along a longitudinally extending bar 41 secured to the chassis by plates 42. Axle 30 carries a pair of orientable wheels 50 which are hydraulically and mechanically linked to a steering column 11. The column 11 has rigidly affixed thereto a steering wheel 10 and is coupled by a conventional worm-and-gear-segment linkage 12 to a valve rod 15a. The rod 15a terminates in a valve piston 22 which normally closes two ports 61, 62 in a valve cylinder 16, the latter being directly coupled to the steering mechanism by an extension rod 15b articulated at 17 to a lever arm 19. The ports 61, 62 lead to respective fluid-discharge lines 31, 32 which serve as the inputs to a hydraulic cylinder 37. The fluid is admitted into valve cylinder 16 from a reservoir 60 via a supply line 21 while a tube 22' drains it from the cylinder 16. Valve piston 22 is so dimensioned as to be movable relatively to cylinder 16 only over a small distance sufficient to unblock the ports 61 and 62.

Lever arm 19 is rigidly secured to a profiled pivot shaft 18 journaled in the chassis 20 as a first steering post. The piston 29 of hydraulic cylinder 37 is connected to a primary lever 35 which is similarly rigid with the pivot shaft 18 and may, in fact, be integral with arm 19. Primary lever 35 is articulated to an intermediate link 40 which is in turn articulated to a secondary lever 35' rigidly secured to a similarly profiled pivot shaft 18' defining a second steering post. The pivot shafts are adapted to engage the correspondingly profiled hub 123 of a triangular lever 23 connected at its base by joints 24 with a pair of tie rods 28 hinged to arms 26 which are rigidly secured to the steering knuckles 33 of wheels 50. Triangular lever 23 is engageable alternately with pivot shaft 18 at the first steering post (FIG. 1) and with pivot shaft 18' at the second steering post (FIG. 3) with concurrent displacement of axle 30 along bar 41 by means of its supporting bracket 43. It will be noted that the joints 24 define with hub 123 an isosceles triangle.

In operation, a rotation of the steering wheel 10 in the clockwise direction will displace rod 15a forwardly, thus opening port 61 and permitting a flow of hydraulic fluid into the cylinder 37 forwardly of its piston 29, thereby causing a rearward displacement of the latter and consequently a rotation of primary lever 35 and pivot shaft 18 in the same (clockwise) sense. Pivot shaft 18, in turn, entrains the linkage 23, 28, 26 and constrains the wheels 50 to be displaced similarly about their steering knuckles 33 for a right-hand turn. Should a failure of the hydraulic system ensue, the displacement of rod 15a would be sufficient to rotate arm 19 in a clockwise sense, thus transmitting a similar rotation to the shaft 18 and to the wheels. Upon a counterclockwise rotation of the steering wheel, port 62 is unblocked to receive fluid from reservoir 60 and to admit it to the hydraulic cylinder 37 rearwardly of piston 29 to effect an opposite swing of the wheels 50 for a left-hand turn; again, any hydraulic defect would produce a like result by direct mechanical interengagement of rods 15a, 15b at their extensions 22 and 16.

In FIG. 3, axle 30 is displaced to its alternate position in which its wheels 50 are controlled from lever 35 via link 40, lever 35', shaft 18', and triangular lever 23 acting again through tie rods 28 and arms 26. In this position the wheels 50 may be driven from a differential 46 via spline shafts 44 and universal joints (not shown), e.g. in a manner more particularly described in commonly assigned application Ser. No. 766,747 filed October 13, 1958 by Werner Hausmann, now Patent No. 2,982,369, to provide four-wheel drive of the vehicle.

Figure 4:
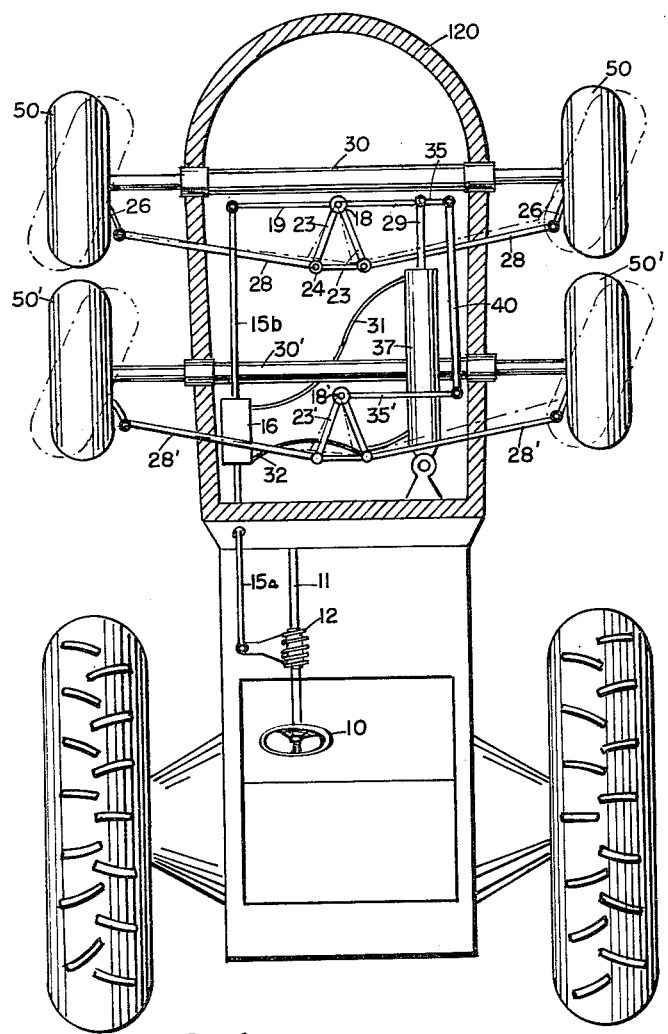
FIG. 4 is a cross-sectional view of a tractor having two front-wheel assemblies both controlled by a steering system according to my invention.

In FIG. 4, I show a tractor provided with a pair of steering axles 30, 30' mounting wheel pairs 50, 50' respectively secured to a chassis 120. The wheels 50, 50' are actuated as described above, the additional wheel pair 50' being fixedly associated with the second steering post 18' by a second triangular linkage 23' whose base joints 24' are connected via tie rods 28' to arms 26' extending from the wheel knuckles. The wheels are shown directed toward the right (dot-dash lines) as a result of a rotation of the steering wheel in a clockwise direction as previously described.

It should be understood that the intermediate link 40, while shown articulated to an extension of primary lever 35, could be coupled with shaft 18 by a connecting member separate from this lever yet positively engaged by the shaft. This link 40, moreover, could be parallel to the axis 18—18', as in FIGS. 1 and 3, or inclined relatively thereto, as shown in FIG. 4. The slightly shorter length of lever 35 compared with lever 35' in FIG. 4 is designed to cause a swinging of wheels 50 through an angle different from the angle of displacement of the wheels 50'. Furthermore, the term "triangular lever," as used in the appended claims, is intended to embrace a rigid connecting member of any shape which is connectable at three spaced-apart points to a shaft and a pair of tie rods, respectively.

Various modifications readily apparent to persons skilled in the art may be made in the above-described embodiments without however departing from the spirit and scope of my invention as claimed.

I claim:

1. A steering mechanism for an automotive vehicle having a chassis and at least one front-wheel assembly including an axle and wheel-controlling rod means extending alongside said axle, said mechanism comprising a first and a second shaft disposed generally vertically on said chassis with relative horizontal spacing in the longitudinal direction of the vehicle, a control member displaceable in two directions from a normal position, first link means operatively connecting said first shaft with said control member for rotation thereby, second link means operatively connecting said second shaft with said first shaft for rotation in unison therewith, and a connecting element extending from said second shaft to said rod means for entrainment of the latter by said first and second link means, said first shaft being engageable by an element identical with said connecting element whereby a front-wheel assembly may also be disposed at a different part of said chassis for orientation of its wheels by said control member, said second link means including a first elongated member rigidly connected to said first shaft, a second elongated member rigidly connected to said second shaft and a third elongated member articulated to said first and second elongated members.

2. A steering mechanism according to claim 1 wherein said mechanism includes a servo-motor operatively connected to one of said elongated members.

3. A steering mechanism according to claim 2 wherein said first link means further comprises a controller for said servo-motor and a mechanical linkage including said controller effective to displace said first shaft upon failure of said servo-motor.

4. A steering mechanism for an automotive vehicle having a chassis, comprising a first and a second shaft disposed generally vertically on said chassis with relative horizontal spacing in the longitudinal direction of the vehicle, a control member displaceable in two directions from a normal position, first link means operatively connecting said first shaft with said control member for rotation thereby, second link means operatively connecting said second shaft with said first shaft for rotation in unison therewith, a connecting element mounted on one of said shafts in positive engagement therewith, and a front-wheel assembly including an axle and wheel-controlling rod means extending alongside said axle, said rod means being linked with said connecting element, said connecting element being detachable from said one shaft and positively engageable with the other of said shafts upon a longitudinal displacement of said front-wheel assembly along said chassis, said second link means including a first elongated member rigidly connected to said first shaft, a second elongated member rigidly connected to said second shaft and a third elongated member articulated to said first and second elongated members.

5. A steering mechanism according to claim 4 wherein said connecting element comprises a triangular lever having key means at one corner of the triangle for removably engaging one of said shafts, said rod means comprising a pair of tie rods respectively linked to said lever at the two other corners of the triangle.

6. A steering mechanism for an automotive vehicle having a chassis, comprising a first and a second shaft disposed generally vertically on said chassis with relative horizontal spacing in the longitudinal direction of the vehicle, a control member displaceable in two directions from a normal position, first link means operatively connecting said first shaft with said control member for rotation thereby, second link means operatively connecting said second shaft with said first shaft for rotation in unison therewith, a first connecting element extending generally horizontally from said first shaft in positive engagement therewith, a second connecting element extending generally horizontally and parallel to said first connecting element from said second shaft in positive engagement therewith, a first front-wheel assembly including a first axle and wheel-controlling first rod means extending alongside said first axle in articulated relationship with said first connecting element, and a second front-wheel assembly including a second axle and wheel-controlling second rod means extending alongside said second axle in articulated relationship with said second connecting element, said front-wheel assemblies being longitudinally offset from each other on said chassis, said second link means including a first elongated member rigidly connected to said first shaft, a second elongated member rigidly connected to said second shaft and a third elongated member articulated to said first and second elongated members.

7. A steering mechanism according to claim 6 wherein each of said connecting elements comprises a triangular lever having shaft-engaging means at one corner of the triangle, each of said rod means comprising a pair of tie rods respectively linked to the associated lever at the two other corners of the triangle.

References Cited in the file of this patent

UNITED STATES PATENTS

| | | |
|---|---|---|
| 2,559,935 | Brown | July 10, 1951 |
| 2,797,764 | Wysong et al. | July 2, 1957 |

FOREIGN PATENTS

| | | |
|---|---|---|
| 951,908 | Germany | Nov. 8, 1956 |